(12) United States Patent
Choi et al.

(10) Patent No.: US 11,900,582 B2
(45) Date of Patent: Feb. 13, 2024

(54) GENERATING TRAINING DATA FOR ESTIMATING MATERIAL PROPERTY PARAMETER OF FABRIC AND ESTIMATING MATERIAL PROPERTY PARAMETER OF FABRIC

(71) Applicant: CLO Virtual Fashion Inc., Seoul (KR)

(72) Inventors: Myung Geol Choi, Seoul (KR); Eun Jung Ju, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 144 days.

(21) Appl. No.: 17/467,372

(22) Filed: Sep. 6, 2021

(65) Prior Publication Data
US 2022/0076405 A1    Mar. 10, 2022

(30) Foreign Application Priority Data
Sep. 7, 2020   (KR) .......................... 10-2020-0113850

(51) Int. Cl.
*G06T 7/00* (2017.01)
*G06T 7/543* (2017.01)
*G06T 3/40* (2006.01)
*G06T 19/20* (2011.01)

(52) U.S. Cl.
CPC ............ *G06T 7/0004* (2013.01); *G06T 3/403* (2013.01); *G06T 3/4046* (2013.01); *G06T 7/543* (2017.01); *G06T 19/20* (2013.01); *G06T 2207/20081* (2013.01); *G06T 2207/20084* (2013.01); *G06T 2207/30124* (2013.01); *G06T 2210/16* (2013.01); *G06T 2219/2004* (2013.01); *G06T 2219/2021* (2013.01)

(58) Field of Classification Search
CPC ....... G06T 3/4046; G06T 3/403; G06T 7/543; G06T 7/5434; G06T 19/20; G06T 19/205; G06T 2207/20081; G06T 2207/20084; G06T 2207/30124; G06T 2210/16
See application file for complete search history.

(56) References Cited

U.S. PATENT DOCUMENTS

| | | | |
|---|---|---|---|
| 2011/0148871 A1 | 6/2011 | Kim et al. | |
| 2019/0281915 A1* | 9/2019 | Levi | A41H 43/00 |
| 2020/0320769 A1* | 10/2020 | Chen | G06F 18/214 |

(Continued)

FOREIGN PATENT DOCUMENTS

| | | | |
|---|---|---|---|
| JP | 4793974 B2 | 10/2011 | |
| WO | WO 2017/203262 A2 | 11/2017 | |

OTHER PUBLICATIONS

Bouman, K.L et al., "Estimating the Material Properties of Fabric from Video," 2013 IEEE International Conference on Computer Vision, Dec. 2013, pp. 1984-1991.

(Continued)

*Primary Examiner* — Matthew Salvucci
(74) *Attorney, Agent, or Firm* — WTA Patents (57) ABSTRACT

Estimating a material property parameter of fabric involves receiving information including a three-dimensional (3D) contour shape of fabric placed over a 3D geometric object, estimating a material property parameter of the fabric used for representing drape shapes of 3D clothes made by the fabric by applying the information to a trained artificial neural network, and providing the material property parameter of the fabric.

20 Claims, 8 Drawing Sheets

(56) References Cited

U.S. PATENT DOCUMENTS

2021/0004648 A1\* 1/2021 Ghosh ................ G06F 18/2148
2021/0383115 A1\* 12/2021 Alon .................. G06Q 30/0276

OTHER PUBLICATIONS

Yang, S. et al., "Learning-based Cloth Material Recovery from Video," 2017 IEEE International Conference on Computer Vision, Oct. 2017, pp. 4393-4403.

Dai, X. et al. "Drape Formation Based on Geometric Constraints and its Application to Skirt Modeling." International Journal of Clothing Science and Technology, vol. 13, No. 1, Feb. 2001, pp. 23-37.

Glombikova, V. et al. "Drape Evaluation by the 3D Drape Scanner." Tekstil ve Konfeksiyon, vol. 24, No. 2, Dec. 1, 2014, pp. 279-285.

Hussain, A. et al. "A New Approach to Evaluate Fabric Hand Based on Three-Dimensional Drape Model." AUTEX Research Journal, vol. 20, No. 2, Jun. 2020, pp. 155-167.

Ju, E. et al. "Estimating Cloth Simulation Parameters from a Static Drape Using Neural Networks." IEEE Access, vol. 8, Oct. 26, 2020, pp. 195113-195121.

Kim, J. "A Study on the Fabric Drape Evaluation Using a 3D Scanning System Based on Depth Camera with Elevating Device." Journal of Fashion Business, vol. 19, No. 6, Dec. 2015, pp. 28-41.

\* cited by examiner

GENERATING TRAINING DATA FOR ESTIMATING MATERIAL PROPERTY PARAMETER OF FABRIC AND ESTIMATING MATERIAL PROPERTY PARAMETER OF FABRIC

CROSS-REFERENCE TO RELATED APPLICATION

This application claims the benefit of Republic of Korea Patent Application No. 10-2020-0113850, filed on Sep. 7, 2020, in the Korean Intellectual Property Office, the disclosure of which is incorporated herein by reference.

BACKGROUND

1. Field of the Invention

Embodiments relate to generating training data for training an artificial neural network to estimate a material property parameter of fabric and estimating the material property parameter of fabric using the trained artificial neural network.

2. Description of the Related Art

Clothes appear in three dimensions when worn on a person's body, but they can be deemed as two dimensional objects because the clothes are actually a combination of pieces of fabric cut according to a two-dimensional (2D) pattern. Because fabric forming the clothes is flexible, the fabric may be varied in appearance according to a body shape or motion of a person wearing the clothes. In addition, the fabric may have various material properties such as, stiffness, elongation, and shrinkage. Due to differences in material properties of fabrics, even clothes of the same design may result in different forms and feels.

SUMMARY

Embodiments relates to estimating a material property parameter of fabric by processing a 3D contour shape of the fabric using a trained artificial neural network. A three-dimensional (3D) contour shape of fabric with at least a portion of the fabric placed on a 3D geometric object and another portion of the fabric hanging from the 3D geometric object is received. The 3D contour shape of the fabric is processed by the trained artificial neural network to estimate the material property parameter of the fabric. The estimated material property parameter is provided.

In one or more embodiments, an image including the 3D contour shape of the fabric is received. A 3D model with the captured 3D contour shape is generated from the image. The coordinates of 3D vertices along a boundary of the 3D model is extracted as the 3D contour shape of the fabric.

In one or more embodiments, 3D scanning is performed on the fabric to generate a 3D scanned image or a depth image of the fabric. The 3D contour shape of the fabric is determined from the 3D scanned image or the depth image.

In one or more embodiments, 3D vertices are sampled from the 3D scanned image or the depth image for determining the 3D contour shape.

In one or more embodiments, a density of the fabric is received. The material property parameter of the fabric is further estimated based on the density of the fabric.

In one or more embodiments, the fabric is natural fiber fabric, synthetic fiber fabric or blended yarn fabric.

In one or more embodiments, the fabric is shaped into a predetermined dimension, and the fabric is placed on a top surface of the 3D geometric object so that a center of the fabric overlaps with a center of the top surface of the 3D geometric object.

In one or more embodiments, the material property parameter of the fabric comprises at least one of a stretch-weft stiffness, a stretch-wrap stiffness, a shear stiffness, a bending-weft stiffness, a bending-wrap stiffness, and a bending bias stiffness.

In one or more embodiments, the artificial neural network is trained using training data generated by randomly upsampling material property parameters according to a probability distribution of a Gaussian mixture model (GMM).

In one or more embodiments, the artificial neural network includes a first sub-neural network trained to estimate a material property parameter related to a stiffness of the fabric; and a second sub-neural network trained to estimate a material property parameter related to bending of the fabric.

In one or more embodiments, each of the first sub-neural network and the second sub-neural network is a fully-connected neural network.

In one or more embodiments, the estimated material property parameter of the fabric is applied to 3D clothes including the fabric. A draping result of the 3D clothes is displayed.

Embodiments also relate to generating training data of an artificial neural network that estimates material property parameters of fabrics. A first number of material property parameters of different fabrics is received. A second number of material property parameters is generated by applying a generation model to the first number of the material property parameters. The second number being greater than the first number. Simulation is performed to generate three-dimensional (3D) contour shapes of simulated fabrics corresponding to the second number of material property parameters. The contour shapes of the fabrics include portions of the fabrics hanging from a 3D geometric object. Training data including the generated 3D contour shapes of the simulated fabrics and the second number of material property parameters are generated.

In one or more embodiments, the generation model represents a probability distribution of a Gaussian mixture model (GMM).

In one or more embodiments, the artificial neural network is trained to estimate material property parameters of a given fabric using the training data.

Additional aspects of example embodiments will be set forth in part in the description which follows and, in part, will be apparent from the description, or may be learned by practice of the disclosure.

BRIEF DESCRIPTION OF THE DRAWINGS

The features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. Various modifications may be made to the example embodiments. The example embodiments described herein are not to be construed as limiting the scope of the invention.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function is described using the same name or a similar name across different embodiments. Unless otherwise described, description made in one example embodiment may be applicable to another example embodiment and detailed description.

Figure (FIG. 1) is a flowchart illustrating a method of estimating a material property parameter, according to an example embodiment. Three-dimensional (3D) contour shapes of fabric placed over a 3D geometric object may be received 110. The 3D geometric object may have a shape of, for example, a cylinder, a cube, a sphere, a miniature, or a mannequin. At least a portion of the fabric may be placed over the 3D geometric object to be supported by the 3D geometric object while the remaining portion of the fabric hangs from the 3D geometric object. In an example embodiment, the 3D contour shape of the fabric may be formed by an outline of the remaining portion hanging from the 3D geometric object. In an example embodiment, the 3D contour shape of the fabric may represent, for example, a shape of the fabric in a static state where the fabric is fixed.

Figure 1:
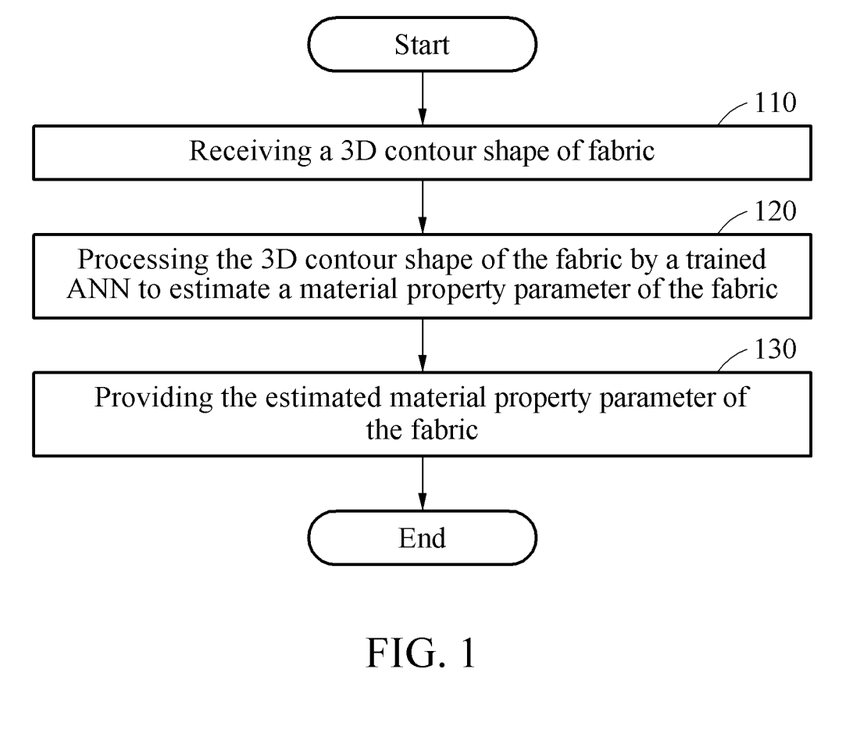
FIG. 1 is a flowchart illustrating a method of estimating a material property parameter, according to an example embodiment.

The fabric may be, among others, natural fiber fabric, synthetic fiber fabric, and blended yarn fabric such as cotton, linen, wool, polyester, nylon, and elastane. The fabric may have, for example, a quadrangular or circular shape.

In one embodiment, the 3D contour shapes of the fabric may be represented as coordinates of 3D vertices of the 3D contour shape from an image of the fabric captured by a camera when fabric is placed over the 3D geometric object. Since it is unlikely that the captured image would differ due to external factors (e.g., environmental factors such as wind, sunlight, lighting, etc.), the coordinates of the 3D vertices extracted from the image by the estimation apparatus may be substantially the same as real coordinates of 3D vertices. In some cases, the estimation apparatus may acquire directly the coordinates of the 3D vertices corresponding to the 3D contour shape of the fabric placed over the 3D geometric object. One way of acquiring the 3D contour shapes is described below in detail with reference to FIG. 2.

In one or more embodiments, the estimation apparatus may further receive a density of the fabric (in addition to receiving the 3D contour shape). The density of the fabric may be obtained by dividing a mass of the fabric by a total area of the fabric. When the density of the fabric is received in addition to the 3D contour shape of the fabric, material property parameters of the fabric further may further take into account the density when estimating the material properties of the fabric.

The material property parameters of the fabric of the 3D clothes draped on the 3D geometric object may be estimated 120 by feeding a 3D contour shape of the fabric to a trained artificial neural network. "Draping" described herein refers to donning 3D clothes including fabric with a certain material property parameter on a 3D object (e.g., 3D avatar) where certain material property parameters are estimated by software.

The artificial neural network described herein may be trained using material property parameters of fabrics of clothes that are placed over or draped onto 3D geometric objects. The artificial neural network may be defined by, for example, an estimation model M as shown in equation 1. The estimation model M may be defined as a linear regression model represented by following equation (1):

$$\ln(y)=M(\{\Omega,d\}), y\in \mathbb{R}^6, \Omega\in \mathbb{R}^{(244\times 3)}, d\in \mathbb{R} \quad (1)$$

where y denotes a vector including six material property parameters to be estimated by the estimation model M, ln(·) denotes an element-wise logarithm, {Ω, d} denotes a feature vector, Ω denotes a set of sampling points for a 3D contour shape of the fabric, and d denotes a set of sampling points for the density of the fabric.

In an example embodiment, the material property parameter of the fabric may be estimated by the estimation model M trained using training data including a large data set that may be larger than the number of sample fabric materials that are practically available. The number of data set for training may be upsampled using, for example, a Gaussian mixture model (GMM) that generates upsampled data sets from a predetermined number (e.g., 400) of mechanical properties of actual fabric materials. The artificial neural network may be trained by training data generated based on randomly upsampled fabric material property parameters as defined by a probability distribution of the GMM. A training principle of the artificial neural network and an operation of the artificial neural network will be described below in detail with reference to FIGS. 3 and 4. Also, a configuration of the artificial neural network will be described in detail below with reference to FIG. 6.

The material property parameters of the fabric estimated using the method described with reference to FIG. 1 may include, for example, a stretch-weft stiffness, a stretch-warp stiffness, a shear stiffness, a bending-weft stiffness, a bending-warp stiffness, and a bending bias stiffness. "Weft" described herein refers to yarn in a transverse direction of the fabric, and may also be referred to as "weft threads." "Warp" described herein may refer to yarn in a vertical direction of the fabric and may also be referred to as "warp threads."

The estimation apparatus may output 130 the material property parameter of the fabric estimated in operation 120. The estimation apparatus may explicitly or implicitly output the material property parameter of the fabric estimated in operation 120. In an example embodiment, explicitly outputting of the material property parameter may include, for example, directly outputting a value of the material property parameter of the fabric through a display panel and/or directly printing the value on a paper. Implicitly outputting the material property parameter may include, for example, displaying a simulation result of the 3D clothes produced by the fabric with the material property parameter, or displaying a simulation result of draping the 3D clothes over a 3D avatar.

Figure 2:
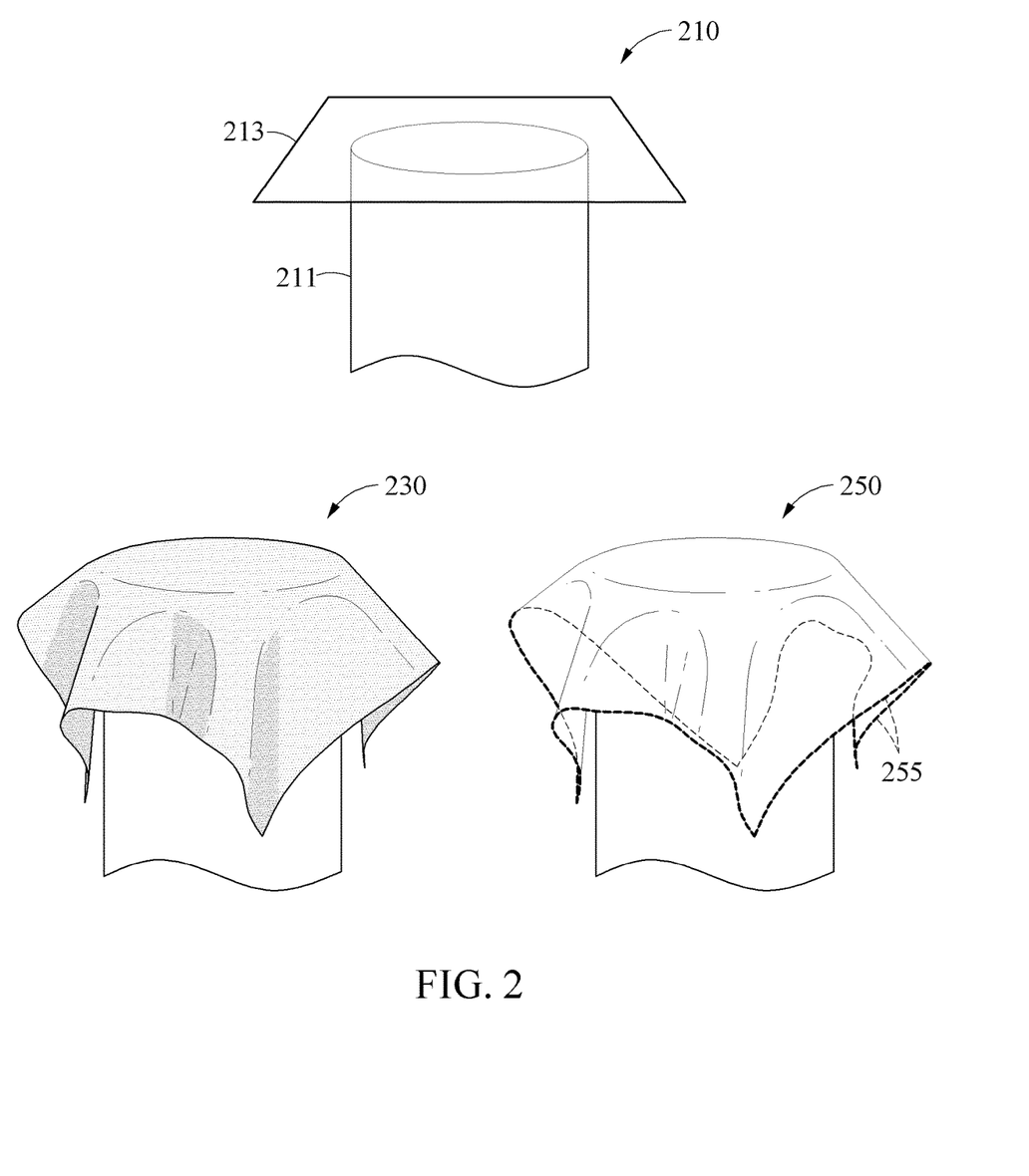
FIG. 2 is a diagram illustrating a method of acquiring information on a three-dimensional (3D) contour shape of fabric, according to an example embodiment.

FIG. 2 is a diagram illustrating acquiring information on a 3D contour shape of fabric, according to an example embodiment. In FIG. 2, drawing 210 shows spreading fabric 213 of a quadrangular shape on the top of a 3D geometric object 211, for example, a cylinder. The fabric 213 may be a specimen of a predetermined size. The diameter of the cylinder 211 may be, for example, 10 cm, and the height of the cylinder may be, for example, 20 cm. In addition, the fabric 213 may have, for example, a shape of a square with 30 cm in width and length. The fabric 213 may be placed on the top of the cylinder 211. The center of the fabric 213 and a center of a top surface of the cylinder 211 may overlap.

When the fabric 213 is placed as shown in the drawing 210, a portion of the fabric 213 extending from the top surface of the cylinder 211 may hang down with wrinkles, as shown in drawing 230. In this case, a horizontal edge and a vertical edge of the fabric 213 may be aligned in a weft direction and a warp direction, respectively. Stiffness of the weft and warp directions may be clearly distinguished. The process of placing the fabric such that the portion of the fabric extending beyond the top surface of the cylinder hangs down and thereby forms wrinkles, as shown in the drawing 230, may be referred to as a "cylinder test."

In an example embodiment, the cylinder test may be simulated to extract a feature vector from actual fabric, predict a material property parameter using an artificial neural network, and evaluate a visual similarity between a predicted result and a result obtained using the actual fabric. In the cylinder test, a 3D contour shape of the fabric may vary based on how the fabric is dropped onto the cylinder. Hence, for consistency, four corners of the fabric are simulated as being dropped from the same height at the same time. Such process may be repeated on a single fabric specimen multiple times and a 3D contour shape of the fabric that repeatedly appears may be selected.

In an example embodiment, by performing the cylinder test using the square-shaped fabric, a clearer contrast between inwardly pleated portions and twisting direction of the fabric can be obtained, and derive more drape areas that may potentially represent various drape shapes. In terms of the square-shaped fabric, since an area of a corner portion is larger than an area of a remaining portion, the corner area may be greater in weight than the remaining portion. As a result, in the case of the square-shaped fabric, a change in the drape shapes according to a weight distribution may be observed more clearly.

A 3D contour shape of the fabric of a portion of a feature vector used for estimating the material property parameter of the fabric through the cylinder test may be determined and processed. The 3D contour shape of the fabric may be a 3D closed curve. As shown in drawing 250, the information on a set of 244 sampling points 255 may be obtained at an interval of about 5 mm to represent the 3D contour shape. The coordinates of the sampling points 255 may represent a contour curve of the fabric extracted in the cylinder test.

In an example embodiment, the material property parameters of the fabric may be estimated using only a 3D contour portion of the fabric instead of the drape shapes of the entire fabric. By doing so, the complexity associated with the process of training the artificial neural network may be reduced. The foregoing example may be based on an assumption that the 3D contour shape of the fabric and the drape shapes of the fabric appearing in the cylinder test generally have a one-to-one correspondence.

Figure 5:
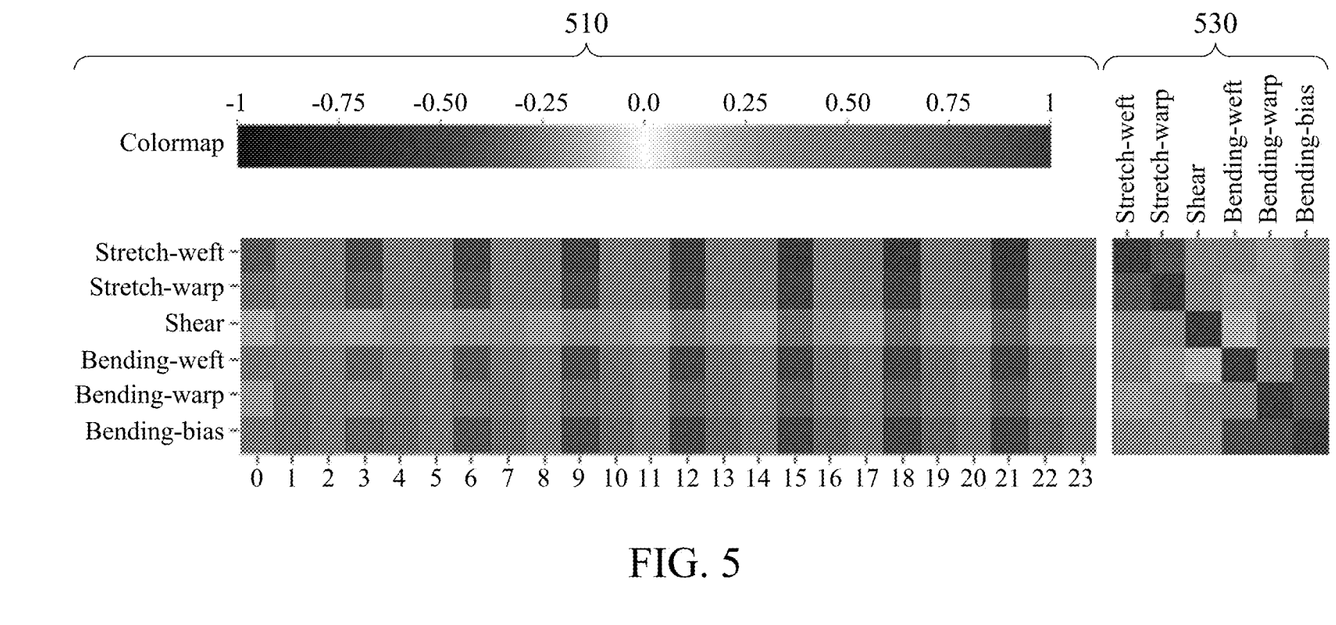
FIG. 5 is a diagram illustrating a correlation between an estimated material property parameter and a 3D contour shape of fabric, according to an example embodiment.

In an example embodiment, the possibility of training from the 3D contour of the fabric to the material property parameter may be verified through a correlation matric between the material property parameter and the 3D contour of the fabric visualized as shown in drawing 510 of FIG. 5.

In one or more embodiments, an image of a 3D contour shape of fabric placed over a 3D geometric object is received. Then, a 3D model having the 3D contour shape of the fabric is generated from the image. The 3D model may be a mesh model. The coordinates of 3D vertices of the 3D contour shape may be extracted from the 3D model. For example, vertices at a boundary of the mesh model of the fabric may be extracted and used as coordinates of 3D vertices of the 3D contour shape.

According to embodiments, the estimation apparatus may use the following methods to reconstruct the 3D contour shape of the draped fabric. For example, the estimation device may use an artificial neural network that reconstructs a 3D contour shape from a top view 2D image of a fabric. The artificial neural network can be trained based on pair data of [top view 2D image–3D contour shape]. Alternatively, the estimation apparatus may perform 3d model reconstruction based on 2d images taken from various angles of the draped fabric to generate a 3d mesh of the fabric, and then reconstruct the 3D contour shape from the 3d mesh. Alternatively, the estimation apparatus may scan the draped fabric with a 3D scanner to generate a 3D mesh, and then reconstruct the 3D contour shape from the 3D mesh.

The mesh model of the fabric may be modeled with a mesh including a plurality of polygons, for example, triangles. For example, three vertices of a polygon (triangle) may be point masses having mass, and sides of the triangle may be represented as springs having elasticity which connects the point masses. Thus, the fabric may be modeled by a mass-spring model, for example. The springs may have respective resistance values against, for example, stretch, shear, and bending, depending on a material property parameter of fabric used. Each vertex may move according to the action of an external force such as gravity, and the action of an internal force such as stretch, shear, and bending. For example, when a force being applied to each vertex is obtained by calculating the external force and the internal force, a speed of a motion and displacement of each vertex may be obtained. Also, a motion of a virtual clothes may be simulated through a motion of vertices of a polygon in each time step.

In an example embodiment, the image indicating the 3D contour shape of the fabric may be a scanned image obtained by 3D scanning the fabric placed over the 3D geometric object using a depth sensor or a depth camera. A 3D mesh model of the fabric may be generated from the scanned image using a technique well known in the art. The 3D vertices on a mesh surface are then sampled from the 3D mesh model to extract the 3D contour shape of the fabric. The sampled vertices may be fitted into, for example, Bezier curves.

In some cases, a set of coordinates of the 3D vertices of the 3D contour shape of the fabric are obtained directly without generating an intermediate 3D mesh model. For example, 3D vertices of the 3D contour shape are sampled directly from a 3D scanned image or a depth image.

When simulating the fabric, the weight of the fabric may significantly affect a final result of draping. For this reason, a density (weight) of the fabric may be further taken into consideration for estimating the material property parameters. Generally, the density of the fabric may not be identified visually. Also, the portion of the fabric that extends over the 3D geometric object and handing from the 3D geometric object may have a higher density or lower stiffness relative to a portion on the 3D geometric object. In an example embodiment, the density of the fabric may become a part of a feature vector to account for a non-visual aspect that affects the shape of the fabric. The density of the fabric may be measured by dividing a mass of the fabric by a total area of the fabric. In an example embodiment, in addition to the 3D contour shape of the fabric, the density of the fabric may also be used to increase an accuracy of the training.

Figure 3:
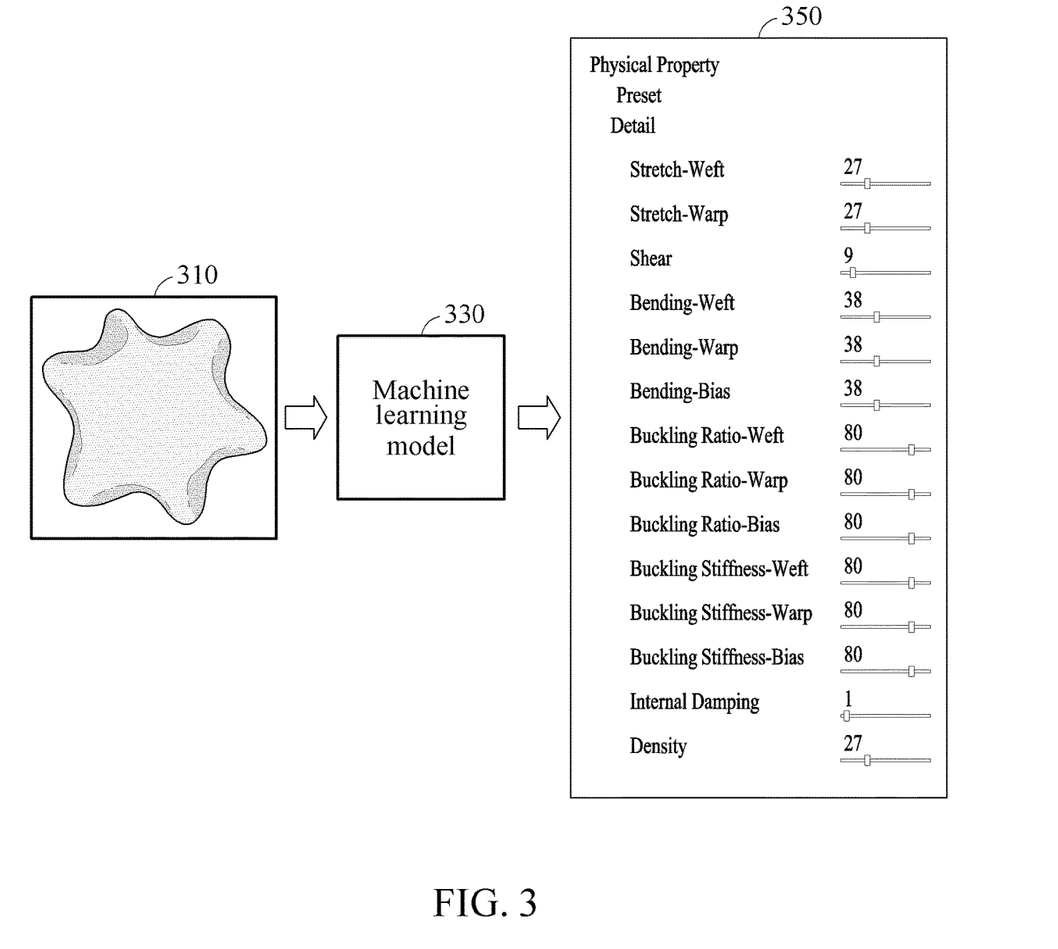
FIG. 3 is a diagram illustrating a principle of training an artificial neural network, according to an example embodiment.

FIG. 3 is a conceptual diagram illustrating a training principle of an artificial neural network according to an example embodiment. FIG. 3 illustrates an image 310 of fabric placed over a 3D geometric object (e.g., cylinder), a machine learning model 330, and material property parameters 350 of the fabric output from the machine learning model 330. The machine learning model may correspond to an artificial neural network according to an example embodiment.

For example, a drape property of the fabric may impacts the appearance of the fabric. Since the drape property of the fabric is a property that can be determined visually, a mechanism may be identified in a photo or video database through machine learning. However, to use a photo or video as training data, an excessively high data diversity may be required due to uncontrollable external factors such as shooting angle, lens properties, lighting, and fabric colors. To handle such diversity, more training data and a more complex training model such as multiple convolutional layers may be required.

Accordingly, in an example embodiment, the machine learning model 330 may be trained to estimate the material property parameters 350 of the fabric from the image 310 of the fabric placed over the 3D geometric object (e.g., cylinder), so that the static drape shapes of the fabric are represented.

Figure 4:
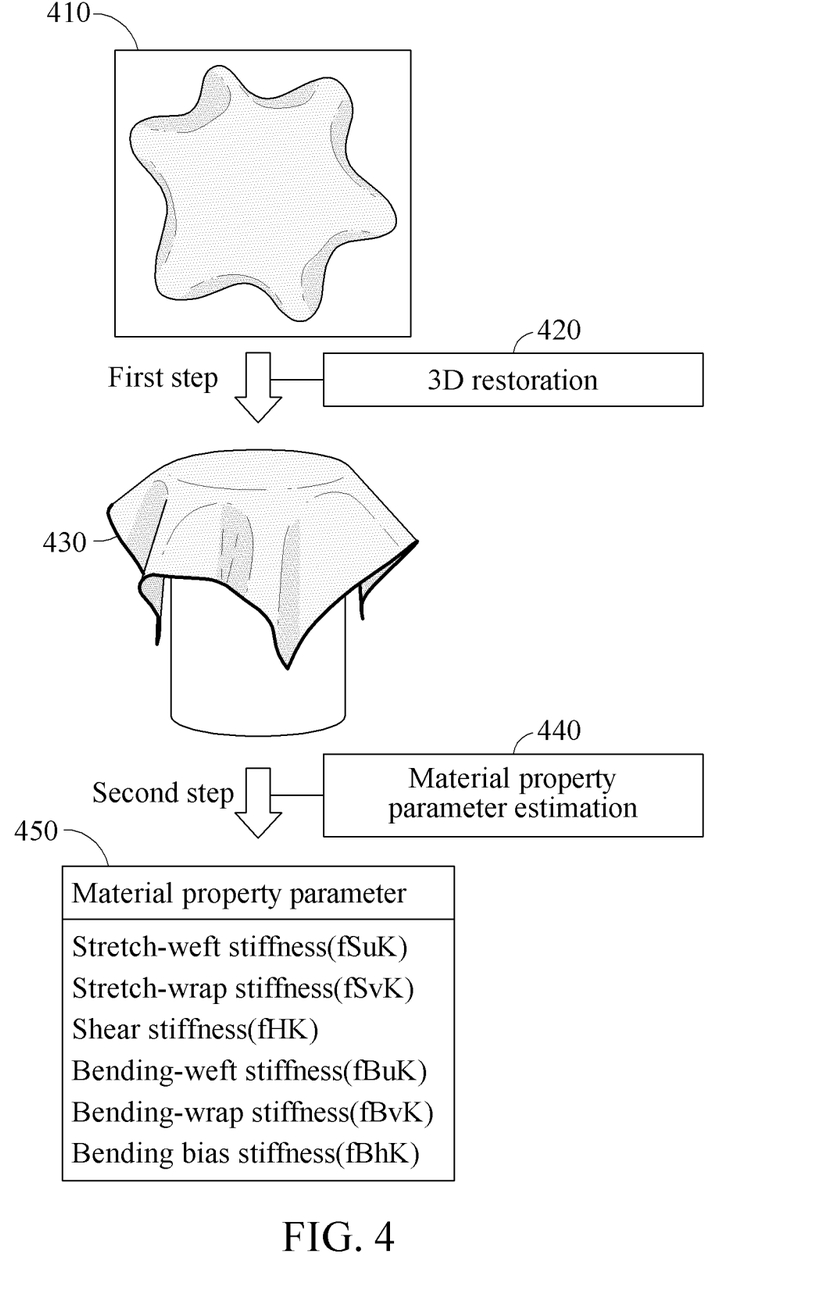
FIG. 4 is a diagram illustrating an operation of an artificial neural network, according to an example embodiment.

FIG. 4 is a diagram illustrating an operation of an artificial neural network, according to an example embodiment. Referring to FIG. 4, the artificial neural network may perform a first-step operation of restoration 420 of a 3D model from an image 410 of fabric placed over a 3D geometric object (e.g., cylinder) and perform a second-step operation of extracting a 3D edge curve 430 from the restored 3D model and estimation 440 of material property parameters of the fabric, so that the material property parameters of the fabric are output 450. In one or more embodiments, the first-step operation and the second-step operation may be performed by an artificial neural network included in an estimation apparatus, or the first-step operation may be performed by the estimation apparatus and the second-step operation may be performed by the artificial neural network included in the estimation apparatus.

The image 410 may be, for example, include a 3D contour shape of the fabric placed over the 3D geometric object. According to an example embodiment, when the image 410 of the fabric is received, the artificial neural network may perform the restoration 420 or reconstruction of a 3D model including the 3D contour shape of the fabric from the image 410. The 3D model may be a mesh model of the fabric described above. Since the fabric is in a static state and original shape and size are known, the artificial neural network may relatively easily restore the 3D model.

The artificial neural network may extract 3D coordinates of the edge curve 430 of the 3D contour shape of the fabric from the restored 3D model 420. Normalization may be performed before feeding the 3D coordinates of the edge curve 430 to the neural network. For example, 3d coordinates can be normalized for min, max of each coordinate. Assuming that the column is centered, min/max value for x and z coordinates can be ½ of the width/length of the sample fabric, min for y coordinate can be 0, max for y coordinate can be column height. The normalized value can be calculated as (coordinate−min)/(max−min). The artificial neural network may generate the estimation 440 of the material property parameters of the fabric from the coordinates of the 3D vertices of the 3D edge curve 430 of the fabric.

Here, the input of the machine learning model 330 is the same as the input of the first step of FIG. 4, and the output of the machine learning model 330 is the same as the output of the second step of FIG. 4. The input may be a 3D contour shape of the draped fabric, for example, a set of 3D positions sampled at uniform intervals from the 3D contour shape. The output is the estimated material property parameter (450 in FIG. 4). The material property parameters shown in 350 of FIG. 3 are a list of material property parameters used in general fabric simulation, and in embodiments, the material property parameters shown at 450 of FIG. 4 corresponding to a subset of 350 of FIG. 3 may be used. After the learning of the artificial neural network is completed, when a three-dimensional position set corresponding to the 3D contour shape of a specific fabric is applied as an input to the artificial neural network, the material property parameter defined in 450 of FIG. 4 is estimated.

The process of collecting training data necessary for learning is as follows. Initially, hundreds of actual fabrics and property parameter data are given (which can be provided as presets). In order to generate a new random property parameter having a statistical distribution similar to a given property parameter set, a GMM model is trained from the original data. A desired amount of random property parameter sets are generated from the GMM model, and virtual simulations are performed using the newly created property parameters to generate a 3D contour shape in which the fabric is draped, which is the training data of the artificial neural network model.

FIG. 5 is a diagram illustrating a correlation between estimated material property parameters and a 3D contour shape of fabric, according to an example embodiment. Referring to FIG. 5, drawing 510 shows a correlation matrix between material property parameters of fabric and the 3D contour shape of the fabric and a drawing 530 shows an autocorrelation matrix between the material property parameters of the fabric. In FIG. 5, the horizontal axis represents x, y, and z coordinates of first 30 sampling points of the 3D contour shape of the fabric. Each color of a color map shown in the drawing 510 may indicate that correlations between the material property parameters of the fabric and the 3D contour shape of the fabric are not low.

The x-axis values of the graph in FIG. 5 are in the form of arranging x, y, and z coordinates as one-dimensional data. For example, x, y, z of the first 3d position are data 0, data 1, data 2; x, y, z of the second 3d position are data 3, data 4, data 5; and x, y, z of the k-th 3d position are data 3*(k−1)+0, data 3*(k−1)+1, data 3*(k−1)+2 data. Data 0 to 23 shown in FIG. 5 may represent x, y, and z values of eight sampling data. A correlation value between the horizontal axis data and the corresponding vertical axis data (stretch-weft, stretch-warp, shear, bending-weft, bending-warp, bending-bias) is expressed in color on the vertical axis. The closer the correlation value to 1 or −1 (the darker the color), the greater the correlation between the two data.

Figure 6:
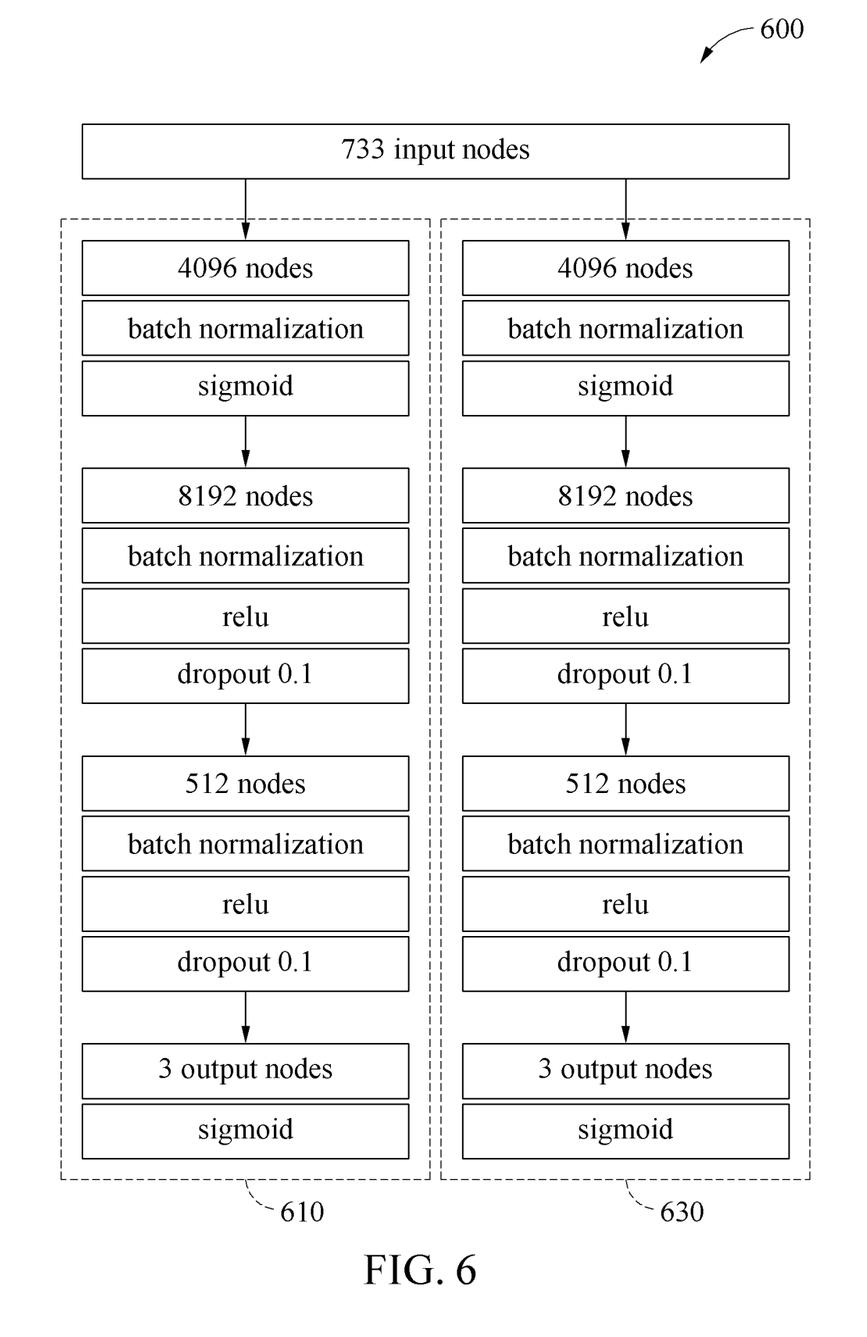
FIG. 6 is a diagram illustrating a configuration of an artificial neural network, according to an example embodiment.

FIG. 6 is a diagram illustrating a configuration of an artificial neural network according to an example embodiment. FIG. 6 illustrates a configuration of an artificial neural network 600 including a first sub-neural network 610 and a second sub-neural network 630, according to an example embodiment.

The first sub-neural network 610 may estimate a material property parameter related to a stiffness of fabric whereas the second sub-neural network 630 estimates a material property parameter related to bending of the fabric. The material property parameter related to the stiffness of the fabric may include, for example, a stretch-weft stiffness, a stretch-wrap stiffness, and a shear stiffness. The material property parameter related to the bending of the fabric may include, for example, a bending-weft stiffness, a bending-wrap stiffness, and a bending bias stiffness.

In this example, the first sub-neural network 610 and the second sub-neural network 630 may be configured as mutually independent fully-connected neural network (FCNN). Above-described equation (1) may be defined in terms of the FCNN model. The inputs of both neural networks are the same 3d positions of the contour sampling points. Two models were learned for each stretch/bend with the same input, and stretch/bend parameters are output from each model.

Referring to drawing 530 of FIG. 5, it can be known that, in the material property parameters related to the stiffness of the fabric ("first group") output by the first sub-neural network 610 and the material property parameters related to the bending of the fabric ("second group") output by the second sub-neural network 630, material property parameters belonging to the same group have strong autocorrelations while a correlation between the two groups is relatively low. The same group means that stretch properties have a strong correlation with other stretch properties (stretch weft/stretch warp/shear), and bend properties have a strong correlation with other bend properties (bend weft/bend warp/bend bias). In each of the first sub-neural network 610 and the second sub-neural network 630, the number of hidden layers and nodes, an activation type, and other parameters may be determined by experiments. In an example embodiment, the neural network model 600 may be trained for, for example, 100 epochs of a 32-batch size.

Figure 7:
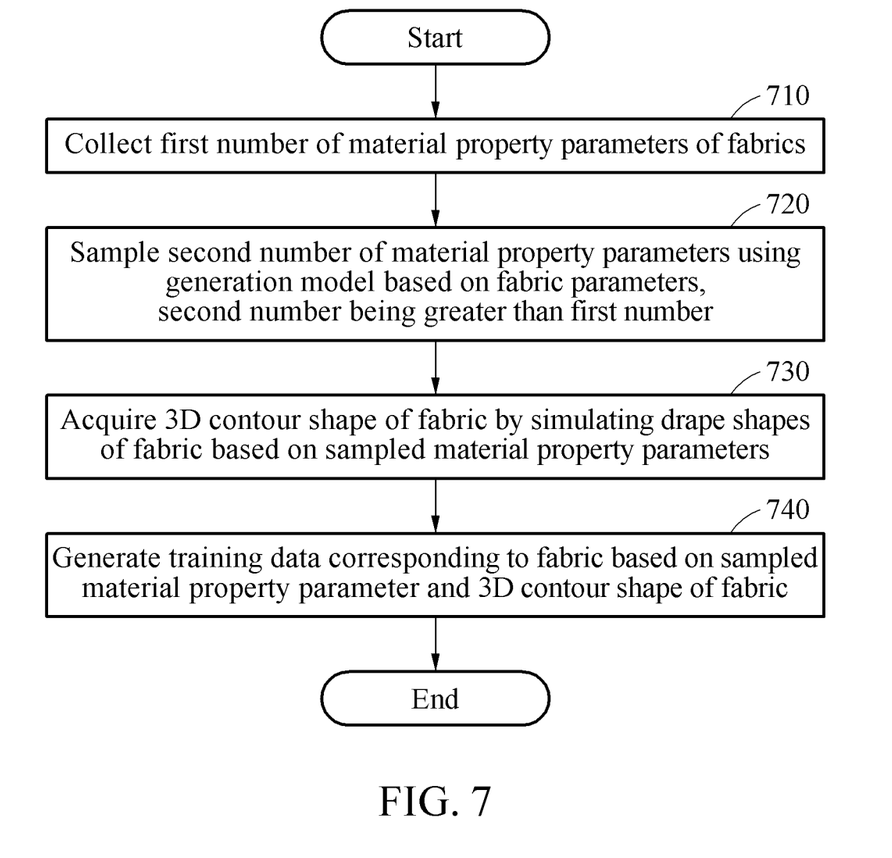
FIG. 7 is a flowchart illustrating a method of generating training data of an artificial neural network, according to an example embodiment.

FIG. 7 is a flowchart illustrating a method of generating training data of an artificial neural network, according to an example embodiment. The first number of material property parameters of fabrics are collected 710. The first number of material property parameters may include, for example, 400 mechanical properties of materials of actual fabric. In addition to the material property parameters of the fabrics, densities of the fabric materials may also be collected. The first number may be, for example, 400.

The second number of material property parameters may be upsampled 720 using the generation model based on the collected material property parameters where the second number is greater than the first number. The generation model may randomly upsample the material property parameter based on a probability distribution of a GMM, for example. In one or more embodiments, the material property parameters and the densities are upsampled to generate a sufficiently large set for training. Upsampling without prior parameter space information likely generates a bias or invalid data set, and invalid data may cause a parameter unsuitable for clothes or physically impossible. To avoid such risks, in an example embodiment, a generation model generated based on mechanical properties measured from actual fabric may be used.

Specifically, to perform the upsampling, each mechanical property set may be converted into six material property parameters (i.e., stretch-weft, stretch-warp, shear, bending-weft, bending-warp, and bending-bias) and a density. Table 1 shows statistics for the six parameters and density measured from 400 actual fabrics.

TABLE 1

|  | Stretch-Weft (g · mm$^2$) | Stretch-Warp (g · mm$^2$) | Shear (g · mm$^2$) | Bending-Weft (g · mm$^2$/s$^2$/rad) | Bending-Warp (g · mm$^2$/s$^2$/rad) | Bending-Bias (g · mm$^2$/s$^2$/rad) | Density (g · mm$^2$) |
| --- | --- | --- | --- | --- | --- | --- | --- |
| mean | 131010.96 | 163944.78 | 75064.22 | 1119.74 | 1370.87 | 1245.30 | 214.02 |
| std. dev. | 158742.72 | 166105.29 | 120353.45 | 3009.62 | 3244.53 | 2712.10 | 66.44 |
| min | 1351.57 | 2783.85 | 638.27 | 33.57 | 45.78 | 45.78 | 53.03 |
| max | 1000000.00 | 1000000.00 | 1000000.00 | 43753.10 | 43753.10 | 27932.70 | 393.43 |

In Table 1, a mean value, a minimum (min) value, a maximum (max) value, and a standard deviation (std. dev.) value may cover a wide range of parameter space to be used for training the artificial neural network. In Table 1, 1,000,000 represents a maximum limit of stiffness defined by the simulation system according to an example embodiment.

A GMM may be generated based on seven parameters (e.g., the six material property parameters and the density) using 400 actual fabric data sets. In an example embodiment, a GMM of 5 clusters is used as the generation model for upsampling the training data. This may have, among others, the following advantages: First, the same number may be upsampled for each cluster, thereby easily avoiding data bias; and second, the probability of upsampling a parameter set unsuitable for clothes or generating an invalid data set may be reduced.

In an example embodiment, for a total of 100,000 samples (20,000 samples for each cluster), the cylinder test may be simulated, and a feature vector may be collected as described with reference to FIG. 2. In this example, a maximum particle distance of the virtual clothes may be about 5 mm, and a time step may be 0.33 seconds. The simulation may be suspended when all particles are in a stable state and discard samples that do not converge.

3D contour shapes of the fabric may be acquired 730 by simulating draping of the fabric onto a 3D geometric object (e.g., cylinder) based on the upsampled material property parameters. The draping shapes of the fabric may simulating placement of the fabric over the 3D geometric object.

The training data of the fabric is generated 740 based on the upsampled material property parameters and the simulated 3D contour shapes. An artificial neural network may be trained using the training data so that the artificial neural network can estimate the material property parameter of the fabric when a 3D contour shape is fed to the artificial neural network.

Figure 8:
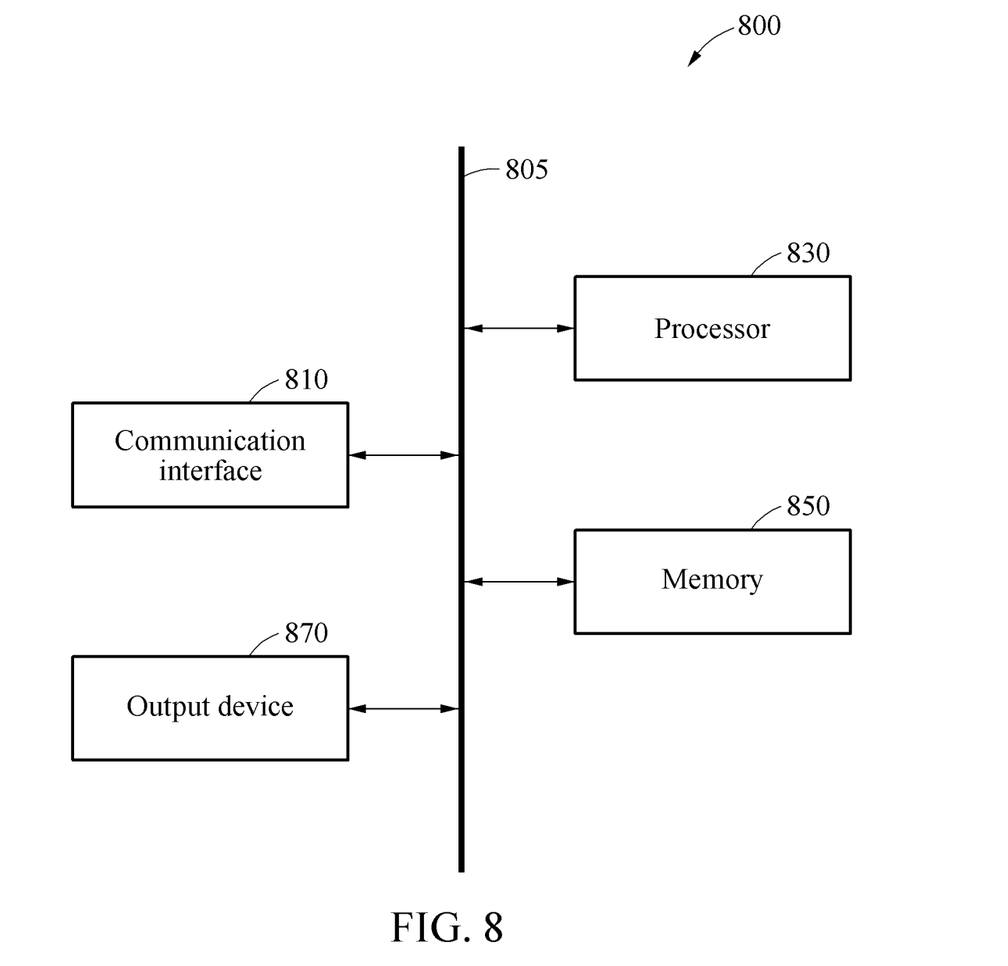
FIG. 8 is a block diagram illustrating a computing device, according to an example embodiment.

FIG. 8 is a block diagram illustrating a computing device 800 for performing the methods and processes described above. The computing device 800 may include a communication interface 810, a processor 830, a memory 850, and an output device 870. The communication interface 810, the processor 830, the memory 850, and the output device 870 may communicate with one another through a communication bus 805.

The communication interface 810 may receive 3D contour shapes of fabric placed over a 3D geometric object. The communication interface 810 may further acquire a weight of fabric or a density of fabric.

The processor 830 may execute instructions to estimate a material property parameter of the fabric used for representing drape shapes of 3D clothes made by the fabric by applying the information to a trained artificial neural network. The 3D contour shape of the fabric and the drape shapes of the 3D clothes may be correlated.

In some cases, the communication interface 810 may receive an image acquired by capturing the 3D contour shape of the fabric placed over the 3D geometric object. In such cases, the processor 830 may generate a 3D model including the 3D contour shape of the fabric from the image. The processor 830 may extract coordinates of 3D vertices corresponding to the 3D contour shape of the fabric from the 3D model.

The memory 850 may store instructions that are executed by the processor 830 to embody the artificial neural network. For this purpose, the memory 850 may, parameters for the artificial neural network (e.g., weights of nodes) and connection or configuration of nodes in the artificial neural network. Further, the memory 850 may store the 3D contour shapes of the fabric and/or the density of the fabric received through the communication interface 810 as well as the material property parameter of the fabric estimated by the processor 830. The memory 850 may store a variety of information generated in a processing operation of the processor 830 described above. Also, the memory 850 may store a variety of data and programs, and the like. The memory 850 may include, for example, a volatile memory or a nonvolatile memory. The memory 850 may include a massive storage medium such as a hard disk to store a variety of data.

The output device 870 may output the material property parameter estimated by the processor 830. The output device 870 may output the material property parameter or output, on a screen, a 3D avatar wearing virtual clothes made by fabric to which the material property parameter is applied. The output device 870 may be, for example, a display device or a printing device that displays pattern pieces on paper or cloth.

In addition, the processor 830 may perform at least one of the methods described above with reference to FIGS. 1 through 9 or an algorithm corresponding to at least one of the methods. The processor 830 may be a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 830 may execute a program and may control the estimation apparatus 800. Codes of the program executed by the processor 830 may be stored in the memory 850.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of estimating a material property parameter of fabric, the method comprising:
   receiving a three-dimensional (3D) shape of a fabric with at least a portion of the fabric placed on a 3D geometric object and another portion of the fabric hanging from the 3D geometric object;
   processing the 3D shape of the fabric by a trained artificial neural network to estimate a material property parameter of the fabric, the artificial neural network trained using training data that includes a second number of material property parameters of second sample fabrics that are generated by applying a generation model to upsample a first number of material property parameters of first sample fabrics, the second number being greater than the first number; and
   providing the estimated material property parameter of the fabric.

2. The method of claim 1, further comprising:
   receiving an image including the 3D shape of the fabric;
   generating a 3D model with the 3D shape from the image; and
   extracting coordinates of 3D vertices along a boundary of the 3D model as the 3D shape of the fabric.

3. The method of claim 1, further comprising:
   3D scanning the fabric to generate a 3D scanned image or a depth image of the fabric; and
   determining the 3D shape of the fabric from the 3D scanned image or the depth image.

4. The method of claim 3, further comprising:
   sampling 3D vertices from the 3D scanned image or the depth image for determining the 3D shape.

5. The method of claim 1, further comprising receiving a density of the fabric, wherein the material property parameter is further estimated based on the density of the fabric.

6. The method of claim 1, wherein the fabric is natural fiber fabric, synthetic fiber fabric or blended yarn fabric.

7. The method of claim 1, wherein the fabric is shaped into a predetermined dimension, and the fabric is placed on a top surface of the 3D geometric object so that a center of the fabric overlaps with a center of the top surface of the 3D geometric object.

8. The method of claim 1, wherein the material property parameter of the fabric comprises at least one of a stretch-weft stiffness, a stretch-wrap stiffness, a shear stiffness, a bending-weft stiffness, a bending-wrap stiffness, and a bending bias stiffness.

9. The method of claim 1, wherein the generation model comprises a Gaussian mixture model (GMM).

10. The method of claim 1, wherein the artificial neural network comprises:
    a first sub-neural network trained to estimate a material property parameter related to a stiffness of the fabric; and
    a second sub-neural network trained to estimate a material property parameter related to bending of the fabric.

11. The method of claim 10, wherein each of the first sub-neural network and the second sub-neural network is a fully-connected neural network.

12. The method of claim 1, wherein the providing of the estimated material property parameter of the fabric comprises:
    applying the estimated material property parameter of the fabric to 3D clothes including the fabric; and
    displaying a draping result of the 3D clothes.

13. A method of generating training data of an artificial neural network, the method comprising:
    receiving a first number of material property parameters of first different sample fabrics;
    generating a second number of material property parameters of second different sample fabrics by applying a generation model to upsample the first number of the material property parameters, the second number being greater than the first number;
    performing simulation to generate three-dimensional (3D) shapes of the second different sample fabrics corresponding to the second number of material property parameters, the shapes of the fabrics including portions of the fabrics hanging from a 3D geometric object; and
    generating training data including the generated 3D shapes of the simulated fabrics and the second number of material property parameters.

14. The method of claim 13, wherein the generation model represents a probability distribution of a Gaussian mixture model (GMM).

15. The method of claim 13, further comprising:
    training the artificial neural network to estimate material property parameters of a given fabric using the training data.

16. A non-transitory computer-readable storage medium storing instructions thereon, the instructions when executed by a processor cause the processor to:
    receive a three-dimensional (3D) shape of fabric with at least a portion of the fabric placed on a 3D geometric object and another portion of the fabric hanging from the 3D geometric object;
    process the 3D shape of the fabric by a trained artificial neural network to estimate a material property parameter of the fabric, the artificial neural network trained using training data that includes a second number of material property parameters of second sample fabrics that are generated by applying a generation model to upsample a first number of material property parameters of first sample fabrics, the second number being greater than the first number; and provide the estimated material property parameter of the fabric.

17. The non-transitory computer-readable storage medium of claim 16, wherein the non-transitory computer-readable storage medium further stores instructions that cause the processor to:

receive an image including the 3D shape of the fabric;
generate a 3D model with the 3D shape from the image; and
extract coordinates of 3D vertices along a boundary of the 3D model as the 3D shape of the fabric.

18. The non-transitory computer-readable storage medium of claim 16, wherein the non-transitory computer-readable storage medium further stores instructions that cause the processor to:

cause 3D scanning of the fabric to be performed to generate a 3D scanned image or a depth image of the fabric; and
determine the 3D shape of the fabric from the 3D scanned image or the depth image.

19. The non-transitory computer-readable storage medium of claim 16, wherein the generation model represents to a probability distribution of a Gaussian mixture model (GMM).

20. A non-transitory computer-readable storage medium storing instructions thereon, the instructions representing an artificial neural network trained by:

receiving a first number of material property parameters of first different sample fabrics;
generating a second number of material property parameters of second different sample fabrics by applying a generation model to upsample the first number of the material property parameters, the second number being greater than the first number;
performing simulation to generate three-dimensional (3D) shapes of the second different sample fabrics corresponding to the second number of material property parameters, the shapes of the fabrics including portions of the fabrics hanging from a 3D geometric object;
including the generated 3D shapes of the simulated fabrics and the second number of material property parameters in training data; and
training the artificial neural network using the training data.

\* \* \* \* \*